United States Patent
Tapia

(10) Patent No.: US 9,800,662 B2
(45) Date of Patent: Oct. 24, 2017

(54) GENERIC NETWORK TRACE WITH DISTRIBUTED PARALLEL PROCESSING AND SMART CACHING

(71) Applicant: TUPL, Inc., Snoqualmie, WA (US)

(72) Inventor: Pablo Tapia, Snoqualmie, WA (US)

(73) Assignee: TUPL, Inc., Bellevue, WA (US)

( * ) Notice: Subject to any disclaimer, the term of this patent is extended or adjusted under 35 U.S.C. 154(b) by 133 days.

(21) Appl. No.: 14/801,763

(22) Filed: Jul. 16, 2015

(65) Prior Publication Data

US 2016/0021188 A1    Jan. 21, 2016

Related U.S. Application Data

(60) Provisional application No. 62/025,450, filed on Jul. 16, 2014, provisional application No. 62/025,950, filed on Jul. 17, 2014.

(51) Int. Cl.
| | | |
|---|---|---|
| *G06F 11/30* | (2006.01) | |
| *H04L 29/08* | (2006.01) | |
| *H04L 12/24* | (2006.01) | |

(52) U.S. Cl.
CPC ...... *H04L 67/1097* (2013.01); *G06F 11/3006* (2013.01); *G06F 11/3065* (2013.01); *H04L 41/082* (2013.01); *H04L 41/0893* (2013.01)

(58) Field of Classification Search
CPC .................. G06F 11/3065; G06F 11/3466
USPC ........................................................ 714/45
See application file for complete search history.

(56) References Cited

U.S. PATENT DOCUMENTS

| | | | | |
|---|---|---|---|---|
| 5,974,237 A | * | 10/1999 | Shurmer ............... | H04L 41/142 709/223 |
| 2007/0061487 A1 | * | 3/2007 | Moore .............. | G06F 17/30575 709/246 |
| 2012/0130801 A1 | * | 5/2012 | Baranov ................ | G06Q 30/02 705/14.43 |
| 2012/0230188 A1 | * | 9/2012 | Godfrey .............. | H04L 41/5035 370/230 |
| 2013/0024567 A1 | * | 1/2013 | Roxburgh ........... | G06F 11/3006 709/224 |
| 2013/0104251 A1 | * | 4/2013 | Moore .................. | G06F 21/602 726/30 |
| 2013/0198245 A1 | * | 8/2013 | Kagan .................... | H04L 67/06 707/812 |
| 2014/0143760 A1 | * | 5/2014 | Buxbaum ........... | G06F 11/3404 717/132 |
| 2014/0201570 A1 | * | 7/2014 | Bielman ............... | G06F 11/079 714/23 |
| 2014/0281739 A1 | * | 9/2014 | Tuffs ................... | G06F 11/3452 714/47.2 |
| 2014/0289080 A1 | * | 9/2014 | Ippolito ................ | G06Q 10/06 705/30 |

(Continued)

*Primary Examiner* — Chae Ko
(74) *Attorney, Agent, or Firm* — Han Santos, PLLC

(57) ABSTRACT

A method and system of distributed parallel processing. There are a plurality of distributed parallel processing units (DPPUs). Each DPPU is configured to receive data related to a condition of the network. The type of data received by each DPPU is disparate for each DPPU. Each DPPU analyzes its data. Upon determining that a predetermined condition is met or a predetermined threshold is exceeded, the disparate data is transformed into a common format using an appropriate driver of the configuration module. The common format data is sent to a storage device of a first DPPU of the plurality of DPPUs.

20 Claims, 7 Drawing Sheets

(56) References Cited

U.S. PATENT DOCUMENTS

| | | | |
|---|---|---|---|
| 2014/0330976 A1* | 11/2014 | van Bemmel | H04L 67/1023 709/226 |
| 2014/0357961 A1* | 12/2014 | Meltzer | A61B 5/0002 600/301 |
| 2014/0380051 A1* | 12/2014 | Branish, II | G06F 21/6227 713/169 |
| 2015/0036515 A1* | 2/2015 | Fayssal | H04L 43/028 370/252 |
| 2015/0381637 A1* | 12/2015 | Raff | H04L 63/0218 726/23 |

* cited by examiner

GENERIC NETWORK TRACE WITH DISTRIBUTED PARALLEL PROCESSING AND SMART CACHING

CROSS REFERENCE TO RELATED APPLICATIONS

This patent application claims priority to U.S. Provisional Application No. 62/025,450, entitled "Generic Network Trace Solution Based on a Distributed Massive Parallel Processing Architecture", filed on Jul. 16, 2014, and to U.S. Provisional Application No. 62/025,950, entitled "Smart Cache for Big Data Consolidation Systems." filed on Jul. 17, 2014, which applications are hereby incorporated in their entirety by reference.

BACKGROUND

Presently, there is a revolution with the advent of virtualized computing techniques. Enterprises may allocate computational resources on the cloud, where processing power, storage, and other computational resources are disaggregated from their physical underlying hardware, and abstracted into virtual machines via hypervisors. Virtual machines are isolated from each other and may be allocated and instantiated without impacting the operation of other virtual machines. In effect, clusters of virtual machines can be hosted on one or more computing nodes (i.e., an aggregate of computing resources allocated by a hypervisor).

Virtual machines may act as a multitenant container via software such as Docker. Storage may also be implemented on a non-relational data store platform that scales out thereby becoming sufficiently performant for large amounts of data. In general, parallel processing algorithms, such as map-reduce, have made big data practical, performant, and cost effective. Furthermore, presently there have been recent advances in performant processing, including on large amounts of data to allow for real-time analysis of data or near-real-time analysis of data. One example includes Spark which provides such processing on Hadoop and leverages in-memory computation.

Virtualization creates computing platforms that scale out for large amounts of data. One example of a context that has large amounts of data is with telecommunications. Network protocol analyzers and data sniffers are two types of tools that are often used by network providers such as mobile operators, to analyze the data that is flowing through their systems. Such analysis on the resulting data collection provides valuable insights onto the network, including the quality of the service in one particular area of a network, what services are in use, and whether there are errors and what type of errors are occurring.

However, present techniques to port existing computing infrastructure tend to allocate a virtual machine to correspond to a physical server in an enterprise. For example, an enterprise with a server with a human resources application and a second server with a finance application, might allocate a virtual machine for the human resources application and a virtual machine for the finance application. By deploying legacy apps in this way, potential advantages of the genericity of functionality provided by the virtual machines is lost.

It is with respect to these considerations and others that the present disclosure has been written.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Introduction

Figure 1:
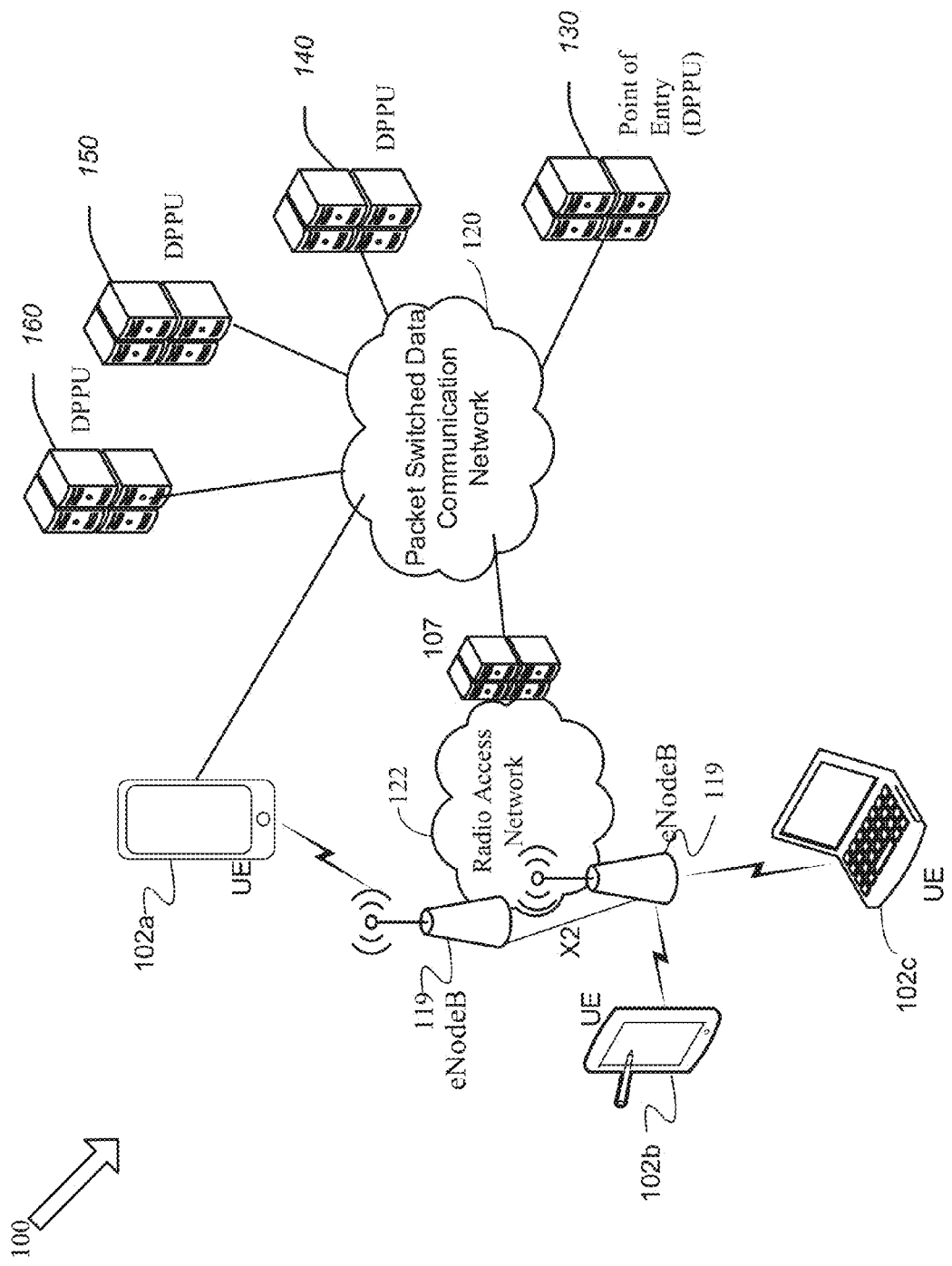
FIG. 1 illustrates an example network architecture for implementing a distributed parallel processing system.

This disclosure generally relates to methods and systems of managing data related to a health of a network. A scalable network backend is provided based on an open architecture that provides simplified access to data related to a network. The concepts discussed herein allow users to dynamically retrieve, store, analyze, and conform their datasets by leveraging open source and fault tolerant distributed technologies. In one aspect, systems and methods are discussed for an architecture that utilizes massive parallel processing (MPP) techniques that can provide network data based on disparate network protocols, working at different data entry points, and over a variety of data types, collectively referred to herein as "disparate data."

A scalable network backend utilizing MPP may be used in multiple contexts. There are applications where patient health data is collected for analysis and subsequent diagnosis, or projections of outbreaks. Other applications may lend itself to the telemetry from sources of water, water purification, and water supply flow from a water utility. The remainder of this disclosure discusses the context of telecommunications, without loss of generality, and explicitly contemplates applications other than that of telecommunications.

Context of Telecommunications

Presently, there is a wide variety of network sniffers and analyzers, each targeting one particular aspect of the network, be it a protocol type (3GPP, IP), layer (radio, transport), or type of data (signaling, user plane). These tools normally run on proprietary hardware platforms and are typically designed to be deployed in single server processing units. Scalability is thus achieved by dividing the input information flow into multiple copies of the tool, which is a cumbersome method that does not make an efficient use of all the available processing power.

Accordingly, these present solutions are designed to solve only one particular analysis problem, and are therefore not generic enough to be used for other protocols and/or data types. Network operators may therefore be forced to acquire multiple protocol analyzers, sniffers, and in general different network analysis toolsets, each of which may use different hardware platforms.

Further, because of the proliferation of network analysis toolsets, there may be a proliferation of data storage techniques, each corresponding to the specific storage solution of a network analysis toolset. Accordingly, it is difficult to consolidate the different storages together to perform queries across data from different network analysis toolsets.

In one aspect, the architecture discussed herein permits reuse of the several hardware units (e.g., servers) that are configured to perform distributed parallel processing in real time (or near real-time) on streams of network data. Network data may comprise network traces, counters, device reports, and any other data that acts as input to network analysis. Typically, network data includes any number of "key performance indicators" (KPIs) exported by network monitoring tools. Network analysis may be performed on a stream of network data at its point of capture. Such streams of network data may be stored in short term memory or long term memory. In one embodiment, the data is filtered based on predetermined criteria, thereby only storing network data that have been determined to be relevant for further analysis. In one embodiment, the disparate data is transformed into a common format and transmitted to a receiver upon a request. The access to the raw and transformed data is facilitated through a common Application Programming Interface (API) layer that allows simultaneous connections to each of the existing distributed collection clusters (i.e., distributed parallel processing unit). This facilitates a holistic synthesis of the data, providing a single point of entry, and avoiding data partitioning (e.g., in geographical areas). Note that the single point of entry is from a logical, rather than a physical perspective. The single point of entry will expose a single entry point (e.g., a single network address) and a common API, but the functionality may be distributed among more than one server, thereby scaling in performance.

In one aspect, the distributed topology enables high throughput data processing with minimum delay, high availability, and replication for fail-over, and potential savings in the transport links, due in part to the content filtering and compression, provided by the intelligence layer of the distributed processing system.

The elements of the distributed parallel processing system discussed herein can be hosted in commodity hardware nodes, with linear increase of processing power as more parallel processing units (e.g., servers) are added to the cluster. Accordingly, in one embodiment, the system discussed herein is elastic in that additional DPPUs can be added to linearly increase a processing power of an aggregate DPPUs. In one embodiment, there is a data source connection manager that is configured to determine whether there is a fault with one of the distributed parallel processing units (DPPUs) and provide a reset to the connection with the data source, as appropriate. The Data processing unit may work together with a message queue unit to ensure that no data is lost in case of transmission failure or peaks of processing load.

In various embodiments, disparate data may be stored locally at each DPPU in a short term memory (e.g., RAM) or long term memory, (e.g., hard disk). Disparate data that has been transformed into a common format may be saved by the DPPU at the single point of entry in short term memory or long term memory, sometimes referred to herein as the measurements megastore.

In one embodiment, if a DPPU is deemed to be unreliable (e.g., exhibit an error), even if the short term memory may lose data, upon refresh that may be initiated by the data source connection manager, the data stored in the long term memory may replenish the short term memory.

In one aspect, the systems described herein provide an open platform where multiple data feeds from sources that have disparate data are combined and processed in real time. In one embodiment, the system performs continuous monitoring and transmission of the monitored data from each network node (e.g., DPPU), which can be synthesized at a single point of entry DPPU. The synthesized data harvested from various DPPUs is analyzed for potential problems.

Each DPPU can be configured with a module having one or more drivers that are configured to transform disparate data into a common format.

Example System Architecture

FIG. 1 illustrates an example network architecture for implementing a distributed parallel processing system. FIG. 1 illustrates a mobile communication network 100 as may be operated by a carrier or service provider to provide a wide range of mobile communication services and ancillary services or features to its subscriber customers and associated mobile device users. The elements generally indicated by the reference numeral 100 are elements of the mobile communication network and are operated by or on behalf of the carrier. The mobile communication network 100 provides communications between user equipment (UE) 102a to 102c, as well as communications for the UE with networks and stations outside the mobile communication network 100.

For purposes of later discussion, several UE's appear in the drawing, to represent some examples of the devices that may receive various services via the radio access network 122. Today, UE's typically take the form of portable handsets, smart-phones, tablet computers, personal digital assistants (PDAs), and smart watches, although they may be implemented in other form factors, including consumer, business, and medical electronic devices. The mobile communication network 100 allows users of the UE's (e.g., customers or subscribers to the radio access network 122) to initiate communication, and receive information from the packet switched data communication network 120.

The mobile communication network 100 typically is implemented by a number of interconnected networks. Hence, the overall network 100 may include a number of Radio Access Networks (RANs) 122, as well as regional ground networks interconnecting a number of RANs and a wide area network (WAN) interconnecting the regional ground networks to core network elements, such as the Multimedia Messaging Service Centers (MMSCs). A regional portion of the network 100, such as that serving UE's 102b and 102c may include one or more RANs (represented by wireless communication network 122) and a regional circuit and/or packet switched network and associated signaling network facilities.

Physical elements of a RAN 122, operated by one of the mobile service providers or carriers, include a number of base stations represented in the example of FIG. 1 by an eNodeB 119 node. Such eNodeB 119 nodes may include a base transceiver system (BTS) that communicates via an antennae system at the site of the node and over the air-link with one or more of the UE's (102a to 102c) when the UE's are within range. Each eNodeB 119 node may include a BTS coupled to several antennae mounted on a radio tower within a coverage area often referred to as a "cell." The BTS is the part of the radio network that sends and receives RF signals to/from the UE's that the eNodeB node 119 currently serves. The radio access networks 122 carries the user communications for the UE's between the respective eNodeB 119 nodes and other elements with or through which the UE's communicate. In various embodiments, the radio that transmits communication signals (to one or more UE's) at each eNodeB may adjust the power output, bandwidth, etc., based on contextual information received from a measurements megastore 140 and/or alerts received from a monitoring server 130, discussed in more detail later. Individual elements such as switches and/or routers forming the radio access network 122 are omitted here for simplicity but are discussed in relevant part in the context of FIG. 2.

The radio access network portion 122 of the mobile communication network 100 connects to a packet data communication network (PDCN), such as the network commonly referred to as the "Internet" shown at 120. Packet communications via the radio access network 122 and the PDCN 120 may support a variety of services through the network 100, such as providing data via the point of entry DPPU server 130 and/or from the measurements megastore (not shown in FIG. 1) and receive alerts from the same, as well as provide communications of text and multimedia messages, e-mail, web surfing or browsing, programming and media downloading (including audio and video), etc. to the UE's. For example, the UE's 102$a$ to 102$c$ may be able to receive messages from and send messages to user terminal devices, such as personal computers, either directly (peer-to-peer) or via various servers (not separately shown).

Of note for purposes of this discussion, the network data discussed herein may be sent to and requests received from various UE's using the radio access network 122. The Evolved Packet Core (EPC) of the radio access network 122 uses the concept of Evolved Packet System (EPS) bearer channels to route IP traffic from a gateway 107 in the radio access network 122 to a UE. A bearer channel is an IP packet flow with a defined quality of service (QoS) between the Packet Data Network (PDN) Gateway (PGW) 107 and the UE (e.g., 102$a$ to 102$c$).

The eNodeBs 119 are normally interconnected with each other by an interface known as "X2." The communication between each eNodeB includes Radio Resource Management (RRM), which covers all functions related to the radio bearers, such as radio bearer control, radio admission control, radio mobility control, scheduling, and dynamic allocations of resources to UEs in both uplink and downlink. In one aspect, the RRM can communicate with the DPPU 130 and/or the measurements megastore (not shown in FIG. 1) to receive data therefrom.

In one embodiment, network 100 includes a plurality of DPPUs 130 to 160, which are coupled for communication via the Packet Switched Data Communication Network (PSDCN) 120. It should be noted that PSDCN 120 has been used by way of example only, not by way of limitation. It will be understood that other connections between DPPUs 130 to 160 are possible, including wireless and wired. Each of the DPPUs is configured to perform one or more functions related to determining a different aspect of the condition of the network (e.g., 120 and/or 122) that it is coupled to the DPPU. For example, each DPPU 130 to 160 may be used as a network analyzer configured for collecting (e.g., receiving) data in connection with at least one of a specific mode of operation, type of network, etc. Thus, each DDPU 130 to 160 is configured to receive disparate data related to the health of the network it is coupled to. The data harvested by the DPPUs 130 to 160 can be accessed through a common API via a single point of entry from the DPPU 130. The data provided by single point of entry DPPU 130 is of common format, regardless of the potentially disparate format of the sources of the data. That is because each DPPU is configured to transform the disparate data that it has harvested from the data source into a common format that can be readily processed by a third party accessing the transformed data via the point of entry DPPU 130.

The transformed data provided by the point of entry DPPU 130 may include various network related information, from disparate sources that may be provided in a common format. Traditionally, such synthesis of disparate data was not possible. For example, the data may include information specifically related to Nokia equipment. Siemens equipment, 2.5G technology, 4G technology, etc., that may not be compatible on a single platform. Note further that the subset of data that a network administrator might be interested in need not be partitioned by technology, but could be partitioned by user, timeslot, and a whole host of other dimensions. In this regard, a network administrator may be interested not only in one aspect of the network; rather, the network administrator may want to view data over multiple platforms, systems, formats, etc. in a common format and in a common environment (e.g., on a single screen in a spreadsheet format). By each DPPU efficiently filtering out the irrelevant data and translating the data it into a common format, the network administrator is now able to query different aspects of the health of the network based on disparate data via a single point of entry DPPU 130. The communication of the DPPUs is discussed by way of example later.

Figure 2:
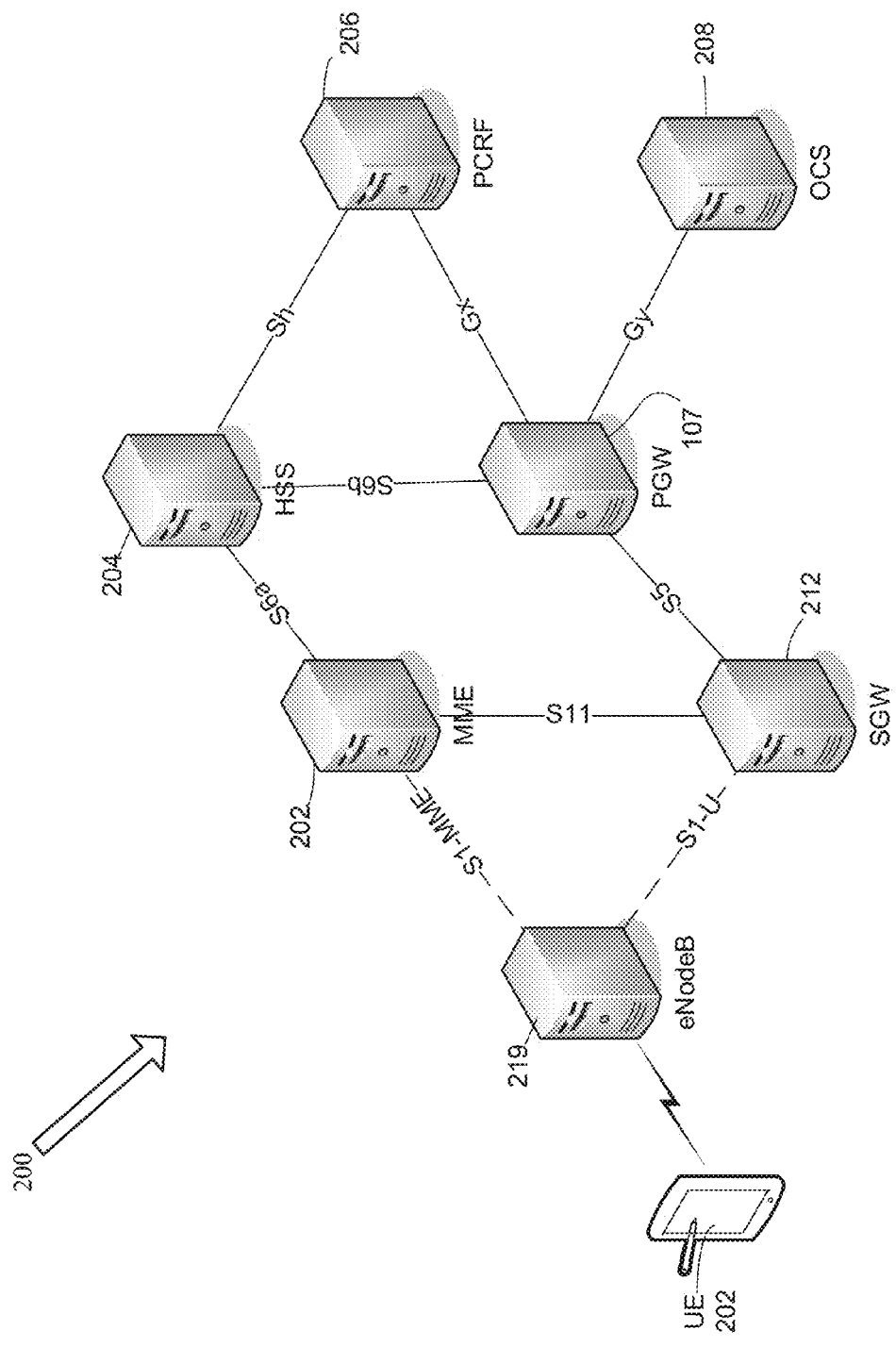
FIG. 2 illustrates an example high level interface block diagram of the elements of a radio access network.

FIG. 2 illustrates an example high level interface block diagram of the logical nodes of a radio access network 122 that may be monitored by one or more DPPs. For example, the System Architecture Evolution (SAE) 200 is the core network architecture of Third Generation Partnership Project's (3GPP's) Long Term Evaluation (LTE) wireless communication standard. The SAE 200 has a flat, all-IP architecture with separation of control plane and user plane traffic. The SAE 200 system includes eNodeB 219, Mobility Management Entity (MME) 202, Home Subscriber Server (HSS) 204, and the Policy Control and Charging Rules Function (PCRF) 206, which are part of the mobile traffic network 122 and are each network elements. The eNodeB 219 can be viewed as an enhanced base station that acts as an interface between the UE 202 and the radio access network 122. MME 202 is a control-node for the communication access network. For example, it is used for idle mode mobile device tracking and paging procedure including retransmissions. It also provides bearer channel activation/deactivation process and selection of the serving gateway (SGW) 212 for the UE 202$e$.

The Home Subscriber Server (HSS) 204 is a central database that contains user-related and subscription-related information. The HSS 204 provides features such as mobility management, call and session establishment support, user authentication and access authorization. For example, the HSS stores the Mobile Station International Subscriber Directory Number (MSISDN), the SIM-card identification information, and the like.

The Packet Data Network (PDN) Gateway (PGW) 107 provides connectivity from the UE 202 to external packet data networks. The Policy Control and Charging Rules Function (PCRF) 206 provides for policy control decision-making, as well as for controlling the flow-based charging functionalities in the Policy Control Enforcement Function (PCEF), which resides in the PGW 107. The PCRF 206 provides the QoS authorization that decides how certain data flow is treated in the PCEF and ensures that this is in accordance with the user's subscription profile.

The Serving Gateway (SGW) 212 routes and forwards data packets to the mobile 202 through the MME 202. For example, a data packet can include a notification message that an account threshold is exceeded. The SGW 212 manages and stores mobile device parameters of the IP bearer channel service, including network internal routing information. Each of these network elements and others can be adjusted in performance based on the contextual data from the measurements megastore and the alerts/messages of the monitoring server 130.

Example Distributed Parallel Processing System

Figure 3:
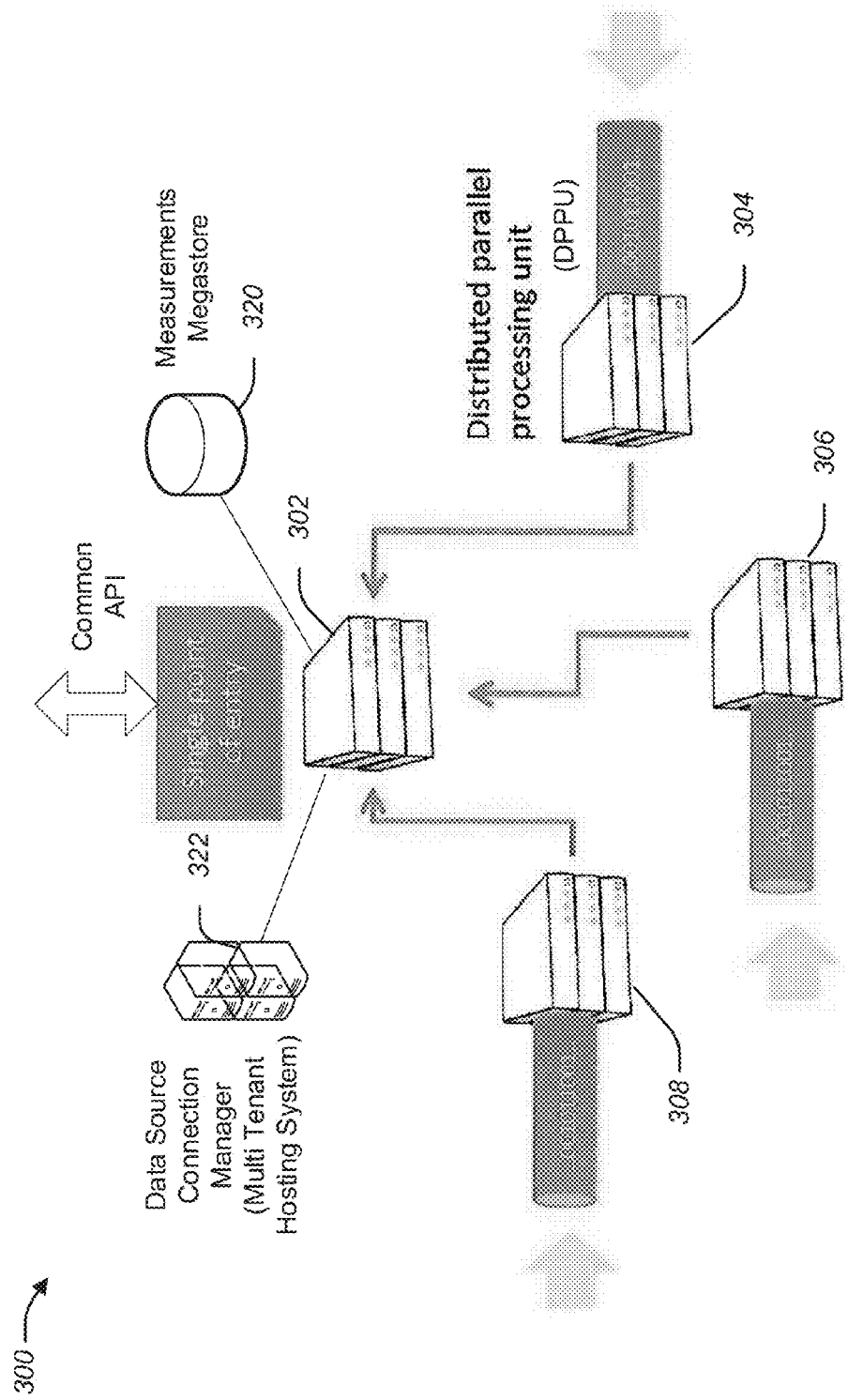
FIG. 3 illustrates an example distributed parallel processing system having a single point of entry.

FIG. 3 illustrates an example distributed parallel processing system having a single point of entry 302. System 300 includes a plurality of DPPUs 302 to 308. Each of the DPPUs is configured to receive data from a data source related to a condition of a network, wherein the type of data received is disparate for each DPPU. For example, DPPU 304 may at a particular time be configured to collect data specific to Nokia equipment, DPPU 308 may at a particular time be configured to collect data specific to Ericsson equipment, and DPPU 306 may at a particular time be configured for only 2G networks. In the example of FIG. 3, DPPU 302 is the single point of entry into the system 300, via a common open API. As previously mentioned, the single point of entry need not be implemented as a single DPPU, but in practice may be distributed among multiple DPPUs.

Each DPPU 302 to 308 is configured to run in multitenant mode, which can spawn multiple virtual machines, each isolated each from other. Each virtual machine can run an instance to perform network analysis, and configured with the appropriate driver or drivers by the configuration module. Each virtual machine can then be reconfigured, or destroyed and replaced with another virtual machine configured differently. In effect the virtual machines act as containers configured to use some amount of computing power available on a DPPU. In this way, the addition of a DPPU strictly represents additional computing power, decoupled from how the computing power is used.

In this way, additional DPPUs may be deployed to elastically scale the capabilities of the system at large. Accordingly, the multi-tenancy feature adds another degree of genericity to the DPPU. Since a DPPU not only can be configured with an arbitrary driver, but also an individual virtual machine instance on a DPPU can be configured with an arbitrary driver, the system can be simply extended by adding DPPUs without concern for how the DPPU will be used for network analysis.

A consequence of each virtual machine being isolated from the running of other virtual machines, is that an additional DPPU may be added without stopping the execution of any of the other virtual machines running on other DPPUs. Note than additional DPPUs may be deployed, not only to scale out data collection, but also to scale out operations of the logical single point of entry.

Each virtual machine (VM) executing on a data collection DPPU 304 to 308 includes an intelligence layer that is operative to analyze the specific data that the DPPU VM has received from a data source. For example, the intelligence layer of each DPPU VM may analyze their respective data and extract patterns and/or trends therefrom. The intelligence layer may determine whether one or more thresholds are exceeded or one or more criteria are met. For example, the intelligence layer may determine that the radio resource management (RRM) module is OFF or the number of dropped calls exceeds 0.1%.

In various embodiments, the considerations by the intelligence layer may include predetermined criteria (e.g., rule set) that are stored in a memory of each DPPU, respectively, which is tailored for the type of data that it is expected to harvest from the data source.

In one embodiment, upon determining that a predetermined condition is met or a predetermined threshold is exceeded, the disparate data is transformed into a common format using a driver of a configuration module of the DPPU VM. Put differently, each data collection DPPU VM running on a DPPU 304 to 308 includes a configuration module that includes one or more drivers that are operative to transform disparate data into a common format. The transformed data can then be sent to a VM on DPPU 302, which acts as a single point of entry to the system 300.

Even though each VM on a DPPU 304 to 308 may be configured to receive a particular type of data, the configuration module is operative to apply the appropriate driver to transform the received data from the data source into a common format. This data can be stored locally by a DPPU VM. In addition (or instead), the DPPU may send the transformed data to a VM on the single point of entry DPPU 302 to make it available to third parties via an open API.

In one embodiment, each VM on a data collection DPPU 304 to 308 is identical in that it includes the flexibility of accommodating disparate data from various sources. For example, in this embodiment, any DPPU could have a VM capable of handling a Nokia 2.5G data request and a VM capable of handling an Ericsson 3G data request on the same DPPU simultaneously.

In one embodiment, the DPPUs are elastic, as described above, and in that additional DPPUs can be dynamically added to the system 300 to accommodate additional demand for processing, and without halting execution of any other part of the system. Ideally, addition of an addition DPPU will add processing power linearly, i.e. with a minimum of overhead.

In one embodiment, system 300 includes a data source connection manager 322. The connection manager 322 is configured to determine whether one or more DPPUs exhibit an error. For example, the connection manager 322 may determine whether any DPPU 302 to 308 is not connected to the network and/or the data source. It may also determine whether any DPPU 302 to 308 has not provided (or processed) data to DPPU 302. In another example, the data source connection manager 322 may determine that transformed data from a DPPU is stuck with the same pattern. In one embodiment, as requests for data streams are made by a third party (e.g., via a query from the single point of entry of the DPPU 302), the data source connection manager 322 creates a runtime to handle that particular request.

In one embodiment, the data source connection manager may keep a log in its memory related to the volume of data received by the DPPU 302 from each DPPU. Upon determining that a DPPU provides a volume of transformed data to DPPU 302 that is below a threshold difference from an average amount of data that was received before during a predetermined time period, the data source connection manager determines that there is an error with that respective DPPU.

Upon determining that a DPPU has an error, the data source manager may send a reset signal to the respective DPPU exhibiting an error, such that the connection between the network and/or the data source is reset. In one embodiment, the data source connection manager 322 provides consistency on the data flow provided via the common open API via the single point of entry of DPPU 302. For example, upon determining that a connection to one or more DPPUs is severed, the data source connection manager 322 does not halt the processing of the disparate data from the other DPPUs. Rather, it allows the data processing from the plurality of DPPUs to continue. In this regard, the defective DPPU may be removed from the message queue or the data may be buffered, such that processing of the data can continue unabated by the healthy DPPUs. It should be noted that while the data source connection manager 322 has been illustrated in the example of FIG. 3 to be outside of DPPU 302, in various embodiments, the data source connection manager 322 may be part of the DPPU 302.

In one embodiment, there is a measurements megastore 320 that is configured to provide, among other things, long term storage of the disparate data in a common format from the single point of entry DPPU 302. In one embodiment, to accommodate the real-time and large volume of information that is being generated by the DPPUs, the measurements megastore 302 uses a massive parallel processing technology such as Hadoop (Zookeeper), Storm, or Spark. While the measurements megastore 320 has been illustrated in the example of FIG. 3 to be outside of DPPU 302, in various embodiments, the measurements megastore 320 may be part of the DPPU 302.

Figure 4:
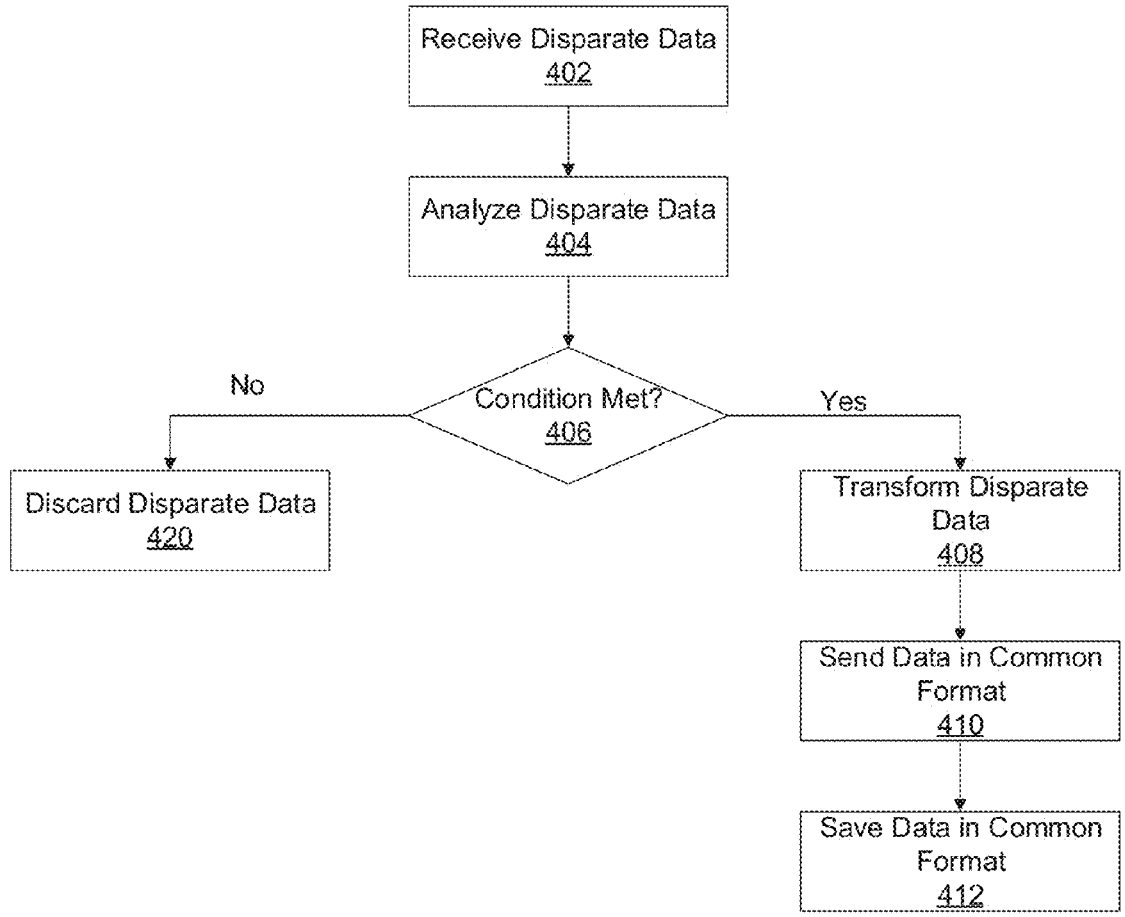
FIG. 4 is a flow diagram of an example process for processing disparate data from the perspective of a non-single point of entry DPPU.

FIG. 4 is a flow diagram of an example process for processing disparate data from the perspective of a non-single point of entry DPPU. In step 402, the DPPU receives data from a data source related to a condition of the network, wherein the type of data received is disparate from other DPPUs.

In step 404 an intelligence layer analyzes the specific data that is has received from the data source. Analyzing the data comprises at least one of extracting patterns and trends from the data.

In step 406 a determination is made by the intelligence layer based on predetermined criteria that are stored in a memory of the DPPU, whether a predetermined condition is met or a predetermined threshold is exceeded.

If not, the disparate batch of data collected by the DPPU is discarded to avoid expending additional resources, such as the local memory and processing power of the DPPU, as well as the resources of the single point of entry DPPU.

Upon determining that a predetermined condition is met or a predetermined threshold is exceeded, in step 408, the disparate data is transformed into a common format using a driver of a configuration module of the DPPU.

In step 410, the data that has been transformed into a common format is sent to the single point of entry DPPU for further processing and/or storage. In one embodiment, in step 412, the data in common format is saved in a local memory of the DPPU. In various embodiments, if the data gathering was in response to a query from a third party via a common API through the single point of entry DPPU, then the data is stored in RAM. Otherwise, it is stored in a local non-volatile memory. In one embodiment, whether data stored in a long-term memory versus a short term memory is based on a value that is assigned to the data. For example, the value is higher if it is more critical to the health of the network, such as the number of dropped calls. If the criticality of the data exceeds a predetermined threshold, the data is stored in a local long term memory. The determination is made by an intelligence layer of the respective DPPU. Thus, the two kinds of persistent storage of the DPPUs include short term and long term.

Figure 5:
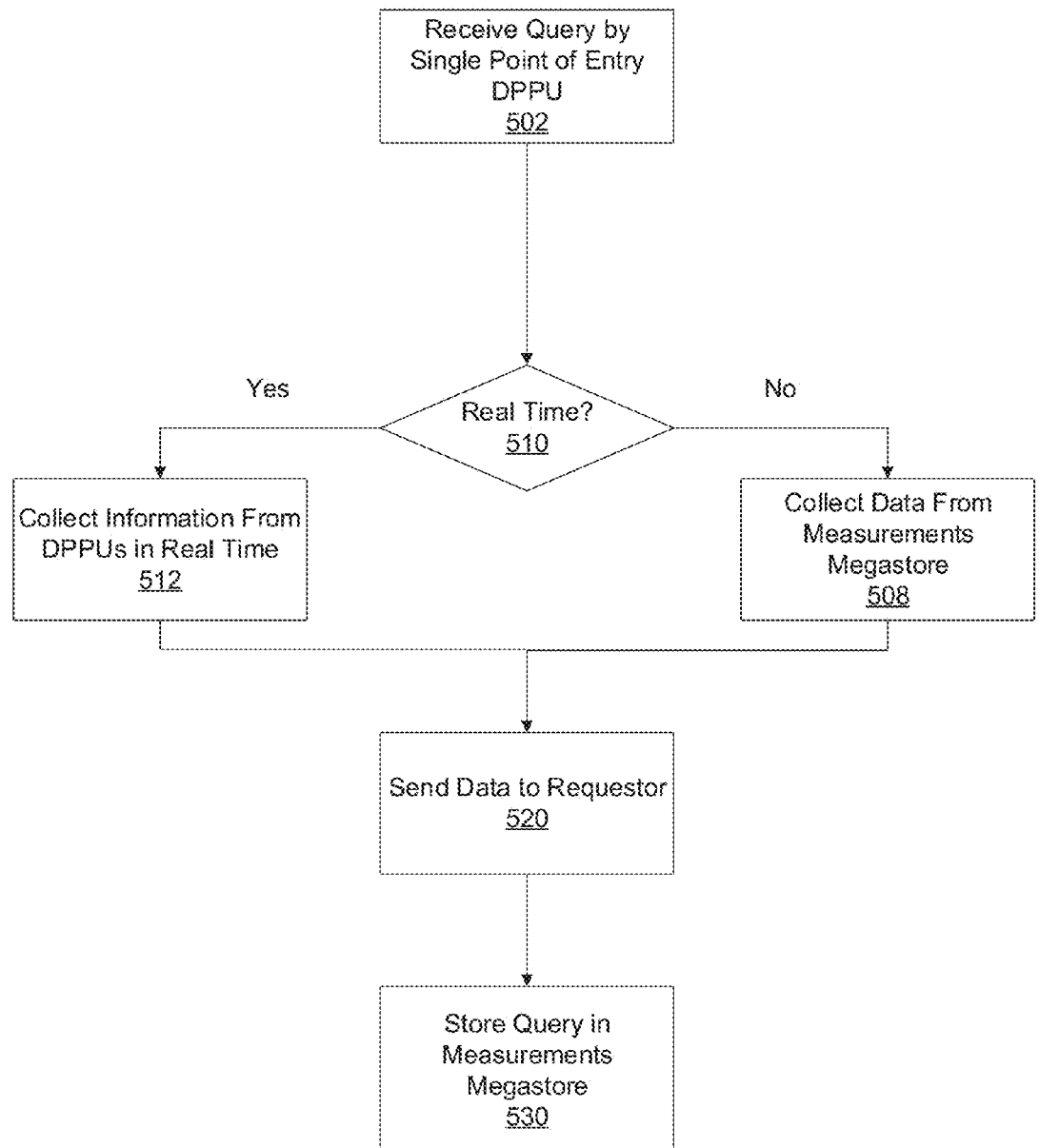
FIG. 5 is a flow diagram of an example process for querying data via the single point of entry DPPU by a third party.

FIG. 5 is a flow diagram of an example process for querying data via the single point of entry DPPU by a third party. In step 502, a third party sends a request to the single point of entry DPPU 302 over an open API, to receive network data therefrom. For example, the query may request data for all 2.5G network data related to an aspect of the network (e.g., number of dropped calls placed by Erikson phones for a week in August).

In step 510, an intelligence layer of the single point of entry DPPU 302 determines whether the request is real time in nature. If so, in step 512, the single point of entry DPPU 302 harvests the relevant data from all DPPUs connected to the single point of entry DPPU 302. The data is provided by the other DPPUs after being translated into a common format.

In step 520, the live data is sent in common format to the requestor via a common open API. In various embodiments, the common format data may be parsed based on the criteria provided in the query. For example, if the query did not specify a particular platform (e.g., Erikson), then all 2.5G network data would be merged together in connection with dropped calls (i.e., not just for Erikson) and sent to the requestor.

In one embodiment, in step 530, the query is stored in the measurements megastore to help identify the value of similar data being harvested by the DPPUs. For example, if there is a frequent (e.g., exceeding a predetermined threshold) request for a substantially similar query, the type of data is attributed a higher value and will be stored in a long term memory (e.g., measurements megastore) for subsequent measurements.

Returning back to step 510, upon determining by the intelligence layer of the point of entry DPPU 302 that the relevant data is not in real time, in step 508, data is collected from the measurements megastore by the single point of entry DPPU 302. In this example, the query relates to a number of dropped calls placed by Ericsson phones for a week in August, so the data is retrieved from the measurements megastore for the particular platform and timeframe, accordingly.

Next, in step 520, the data is sent to the requestor, as discussed above.

Filtration and Smart Cache

In various embodiments, at the single point of entry and/or at each DPPU, there is an intelligence layer that populates the smart cache with data expected to be queried and discards data not likely to be queried, thereby freeing smart cache storage. Specifically, the intelligence layer implements a probability tree where network events and/or key performance indicators (KPIs) are used as first conditions/causes for a query event (e.g. a request the data is to be retrieved). The probability tree is constructed with intermediate causes, and their respective Bayesian probabilities to determine whether a particular subset of data is likely to be queried given particular network events. For example, if a 2.5G subnetwork for Seattle using Nokia equipment experiences a spike in dropped calls, the intelligence layer may determine that queries on Network X for a particular time frame and other criteria are likely to be queried, and therefore, that information should be prepositioned into cache.

Figure 6:
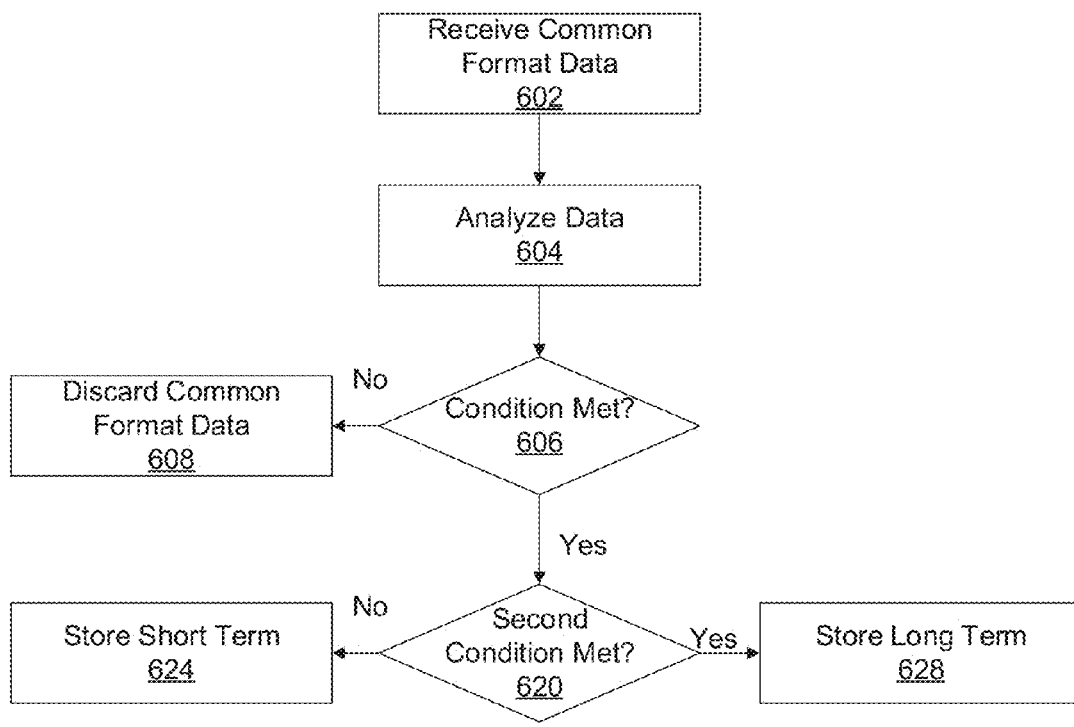
FIG. 6 is a flow diagram of an example process for filtering disparate data.

In this regard, reference is made to FIG. 6, which is a flow diagram of an example process for filtering disparate data. In one embodiment, the flow of FIG. 6 is a continuation of step 410 of FIG. 4 discussed above.

In step 602 the common format data to be cached is received from one or more DPPUs by the single point of entry DPPU 302. In one embodiment, in step 604 an intelligence layer of DPPU 302 based on predetermined first criteria that are stored in a memory of the DPPU 302. In one embodiment, the predetermined first criteria is a determination by the intelligence layer that the data is likely to be queried.

In step 606 the intelligence layer of DPPU 302 determines, whether a second predetermined condition is met or a second predetermined threshold is exceeded. If so, in step 608 the common format data received from multiple DPPUs that had been stored in cache is discarded to recover storage and to make way for other data more likely to be queried. In one embodiment, the predetermined second criteria is a determination by the intelligence layer that the data in the cache is not likely to be queried. In one embodiment, this data may still be available at the local DPPUs.

Upon determining that a first predetermined condition is met or a first predetermined threshold is exceeded, in step 620 a determination is made by the intelligence layer of the DPPU 302 based on predetermined second criteria that are stored in a memory of the DPPU 302. In one embodiment, the second criteria is stored in the measurements megastore 320.

If the second predetermined condition is not met and the second threshold is not exceeded, in step 624, the common format data from the plurality of DPPUs is stored in a short term memory (e.g., RAM) of the DPPU 302.

However, if the second predetermined condition is met or the second threshold is exceeded, the intelligence layer of the DPPU 302 stores the common format data in a long term memory of the DPPU 302. In one embodiment, the common format data is stored in the measurements megastore 320.

In various embodiments, the intelligence layer of the DPPU 302 may indicate an expiration date of the data that is based on a value associated to the data. The criteria used for the determination may be based on time (e.g., data decaying in value over time), severity of the error, prior history of the number of queries for a particular type of error, number of customers or user equipment's affected by this error, etc. For example, the value assigned to data is higher if the potential problem associated with the data is more critical to the health of the network, such as the number of dropped calls. Put differently, the more valuable the data, the longer it is kept in the long term memory (e.g., measurements megastore 320).

In one embodiment, machine learning is used by the intelligence layer of the single point of entry DPPU 302 to predict the value of the data (e.g., what data is most likely to be queried by a third party). For example, machine learning components are used to identify patterns and trends based on pre-determined training sets. Based on a large corpus of data of queries, a machine learning algorithm can determine the probabilities that specific portions of data are likely to be queried, and therefore are to be loaded into the smart cache.

The ability for a smart cache to be prepopulated/predictively populated is of particular importance in a big data environment. Where data is relatively small, techniques to improve cache speed are typically done by reducing the number of processor operations to move data, such as by using memcpy( ) (e.g. in the C Standard Library) and similar bulk copy commands. However, with big data, transferring data is not processor bound, but rather is throughput bound. Accordingly, if data can be moved, even before it is queried, it will speed performance. Otherwise the utility of the cache is diminished since it could conceivably take the same amount of time to access cache, as it would to access memory directly. Accordingly, using machine learning to prepopulate/predictively populate a cache enables a cache in a big data environment to provide performance improvements expected of a cache.

In one embodiment the measurements megastore 320 need not be on site or operated by the client enterprise. The measurements megastore 320 may be hosted in the Internet on a cloud installation. The cloud installation may represent a plurality of disaggregated servers that provide a virtual web application server functionality and virtual database functionality. Cloud services may be made accessible via cloud infrastructure 120, illustrated in FIG. 1.

One of the peculiarities of hosting a smart cache and a megastore on virtualized computing resources, is that potentially the amount of storage on the smart cache would be large enough to directly host all the underlying data. In the case where the process set forth with respect it FIG. 6 causes all the data, or a majority of data, or an amount of data according to a predetermined threshold to be placed in the smart cache, the infrastructure may be directed to copy the data directly to the megastore rather than to the smart cache. In this way, conditions where caching would be non-performant, would be avoided.

Example Computer Platform

As shown by the above discussion, functions for receiving data related to a condition of the network, analyzing the data, determining whether predetermined conditions are met or a predetermined threshold is exceeded, and other functions, can be implemented on computers connected for data communication via the network elements of the radio access network 122, operating as the DPPUs 130 to 160, measurements megastore 140, eNode B 119, and components of the radio access network 122, as shown in FIGS. 1 and 2. Although special purpose devices may be used, such devices also may be implemented using one or more hardware platforms intended to represent a general class of data processing device commonly used to run "server" programming so as to implement the receiving data from various DPPUs, retrieving information from the measurements megastore, analyzing information for determining whether a predetermined condition is met or a predetermined threshold is exceeded, and providing notifications, as discussed above, albeit with an appropriate network connection for data communication.

Figure 8:
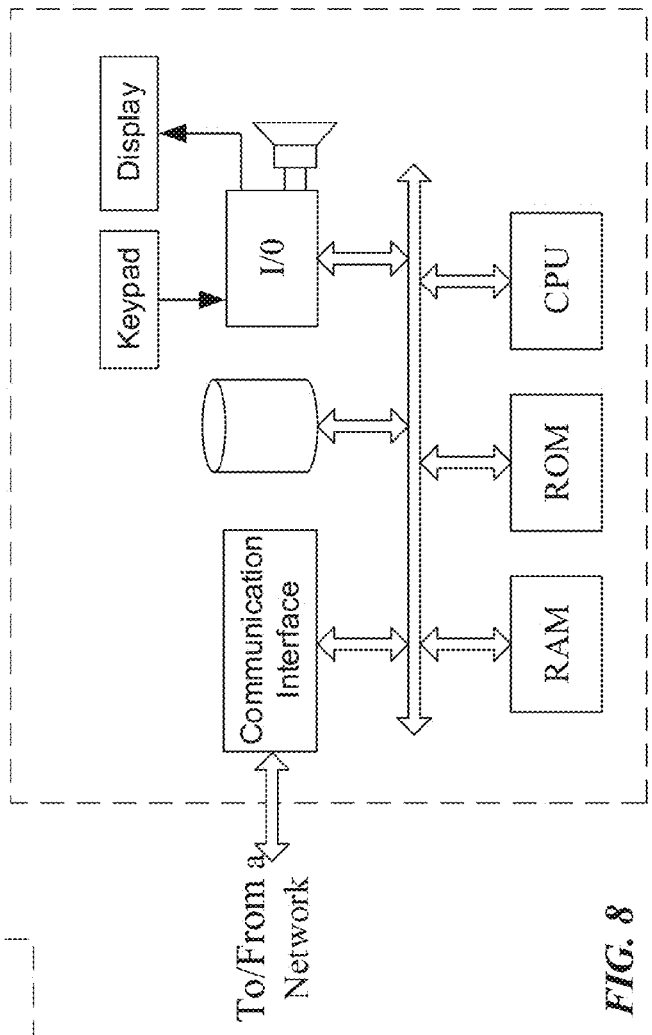
FIG. 8 illustrates a computer with user interface elements.
Figure 7:
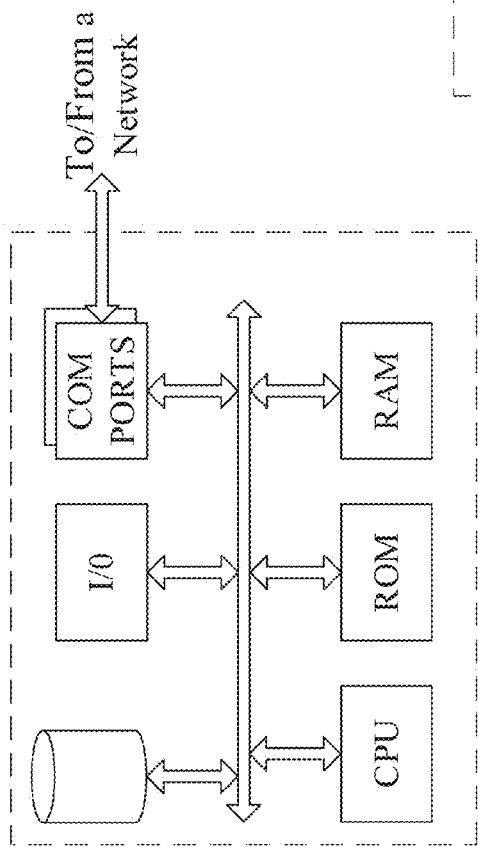
FIG. 7 illustrates a network or host computer.

FIGS. 7 and 8 provide functional block diagram illustrations of general purpose computer hardware platforms. FIG. 7 illustrates a network or host computer platform, as may typically be used to implement a server. FIG. 8 depicts a device with user interface elements, as may be used to implement a personal computer, such as computer 102c of FIG. 1 or a workstation, or to implement a computing device, such as a portable handset, a smart-phone, tablet computer, a personal digital assistant or other type of mobile station or mobile terminal device (e.g., devices 102a to 102c of FIG. 1), although the device of FIG. 8 may also act as a server if appropriately programmed. It is believed that the general structure and general operation of such equipment as shown in FIGS. 7 and 8 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. As used herein, the computer system of FIG. 8 uses a massive parallel processing technology such as Hadoop (e.g., Zookeeper), Storm, or Spark. Of course, the server functions may be implemented in a distributed fashion on a number of similar platforms, to distribute the processing load. In various other embodiments, the functionality of the DPPU 302, measurements megastore 320, and data source connection manager 322, may be combined in one or more server platforms.

The software functionalities involve programming, including executable code as well as associated stored data, e.g., files used for applications on the computing device to receiving data related to a condition of the network, analyzing the data, and determining whether a predetermined condition is met or a predetermined threshold is exceeded. The software code is executable by the computing device. In operation, the code is stored within the computing device. At other times, however, the software may be stored at other locations and/or transported for loading into the appropriate computing device system. Execution of such code by a processor of the computing device enables the computing device to perform functions of retrieving information, analyzing the information, storing the information, etc., in essentially the manner performed in the implementations discussed and illustrated herein.

Hence, aspects of the methods of receiving and processing data as outlined above may be embodied in programming. Program aspects of the technology may be thought of as "products" or "articles of manufacture" typically in the form of executable code and/or associated data that is carried on or embodied in a type of non-transitory machine readable medium.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A distributed parallel processing system comprising:
   a plurality of distributed parallel processing units (DPPUs), wherein individual DPPUs of the plurality of DPPUs execute in a multitenant mode to spawn a plurality of isolated virtual machines that run isolated from each other in the individual DPPUs, each DPPU comprising:
   a processor;
   a network interface coupled to the processor configured to enable communications via a communication network;
   a storage device for content and programming;
   a configuration module having at least one driver; and
   a program stored in the storage device, wherein execution of the program by the processor configures each DPPU to perform acts comprising:
      receiving data related to a condition of the network, wherein a type of the data received is disparate for each DPPU such that each DPPU receives a corresponding type of disparate data that differs from types of data received by other DPPUs;
      analyzing the corresponding type of disparate data via multiple isolated virtual machines of each DPPU;
      upon determining that a predetermined condition is met or a predetermined threshold is exceeded:
         transforming the disparate data into a common format using an appropriate driver of the configuration module; and
         sending the common format data to a storage device of a particular DPPU of the plurality of DPPUs.

2. The distributed parallel processing system of claim 1, wherein the particular DPPU is a single point of entry for access to the data from each DPPU.

3. The distributed parallel processing system of claim 1, wherein transforming the disparate data into a common format is based on a predetermined rule set stored in the storage device of each DPPU, respectively.

4. The distributed parallel processing system of claim 1, further comprising a data source connection manager configured to determine one or more errors of each DPPU.

5. The distributed parallel processing system of claim 4, wherein the data source connection manager is configured to determine one or more errors of each DPPU by at least one of:
   determining whether any DPPU of the plurality of DPPUs is not connected to the network; and
   determining whether any DPPU of the plurality of DPPUs has not sent data to the particular DPPU within a predetermined time period.

6. The distributed parallel processing system of claim 4, wherein the data source connection manager is configured to send a reset signal to a DPPU having an error, upon determining that the DPPU has an error.

7. The distributed parallel processing system of claim 4, wherein the data source connection manager is configured to remove a defective DPPU from a queue, upon determining that the DPPU has an error.

8. The distributed parallel processing system of claim 1, wherein execution of the program further configures each DPPU to perform acts comprising:
upon determining that the predetermined condition is not met and the predetermined threshold is not exceeded, discarding the data from the storage device.

9. The distributed parallel processing system of claim 1, wherein the system is elastic in that additional DPPUs are added to linearly increase a processing power of aggregate DPPUs.

10. The distributed parallel processing system of claim 1, wherein analyzing the data comprises at least one of extracting patterns and trends from the data.

11. The distributed parallel processing system of claim 1, wherein execution of the program further configures each DPPU to perform acts comprising:
upon determining, by an intelligence layer of the DPPU, that a criticality of the data related to the condition of the network exceeds a-first predetermined threshold, storing the data related to the condition of the network in a local long term memory.

12. A distributed parallel processing unit (DPPU), comprising:
a processor;
a network interface coupled to the processor configured to enable communications via a communication network;
a storage device for content and programming; and
a program stored in the storage device, wherein execution of the program by the processor configures the DPPU to perform acts comprising:
receiving, from a plurality of DPPUs having data that is disparate in format from each other DPPU, data that has been transformed into a common format by the respective DPPU;
analyzing the common format data received from each DPPU, respectively, for a first predetermined condition or a first predetermined threshold, and a second predetermined condition or a second predetermined threshold;
upon determining, for each common format data received from a corresponding DPPU, that a first predetermined condition is not met and the first predetermined threshold is not exceeded, discarding the common format data, respectively;
upon determining, for each common format data received from the corresponding DPPU, that a first predetermined condition is met or the first predetermined threshold is exceeded:
upon determining that the second predetermined condition is not met and a second predetermined threshold is not exceeded, storing the respective data in a short term memory; and
upon determining that the second predetermined condition is met or the second predetermined threshold is exceeded, storing the respective data in a long term memory.

13. The DPPU of claim 12, wherein the first DPPU is a single point of entry for access to the data from each DPPU.

14. The DPPU of claim 12, further comprising a data source connection manager configured to determine one or more errors of each DPPU.

15. The DPPU of claim 14, wherein the data source connection manager is configured to determine one or more errors of each DPPU by at least one of:
determining whether any DPPU of the plurality of DPPUs is not connected to the network; and
determining whether any DPPU of the plurality of DPPUs has not sent data to the first DPPU within a predetermined time period.

16. The DPPU of claim 14, wherein the data source connection manager is configured to send a reset signal to a DPPU having an error, upon determining that the DPPU has an error.

17. The DPPU of claim 14, wherein the data source connection manager is configured to remove a defective DPPU from a queue, upon determining that the DPPU has an error.

18. The DPPU of claim 12, wherein one or more additional DPPUs are added to linearly increase a processing power of aggregate DPPUs.

19. The DPPU of claim 12, wherein analyzing the data comprises at least one of extracting patterns and trends from the data.

20. The DPPU of claim 12, wherein execution of the program further configures the first DPPU to perform acts comprising:
assigning a value to a common format data received from a DPPU that is higher if a potential problem associated with the common format data is more critical to a health of the network, and
determining an expiration of the common format data received from the DPPU based on the assigned value.

* * * * *